(12) United States Patent
Zou et al.

(10) Patent No.: US 10,120,495 B2
(45) Date of Patent: Nov. 6, 2018

(54) ARRAY SUBSTRATE, DISPLAY PANEL AND DISPLAY DEVICE CONTAINING THE SAME

(71) Applicants: Xiamen Tianma Micro-electronics Co., Ltd., Xiamen (CN); Tianma Micro-electronics Co., Ltd., Shenzhen (CN)

(72) Inventors: Longsheng Zou, Xiamen (CN); Chaohuang Pan, Xiamen (CN); Zhijie Wang, Xiamen (CN); Shumao Wu, Xiamen (CN)

(73) Assignees: Xiamen Tianma Micro-electronics Co., Ltd., Xiamen (CN); Tianma Micro-electronics Co., Ltd., Shenzhen (CN)

( * ) Notice: Subject to any disclaimer, the term of this patent is extended or adjusted under 35 U.S.C. 154(b) by 86 days.

(21) Appl. No.: 15/294,536

(22) Filed: Oct. 14, 2016

(65) Prior Publication Data
US 2017/0031512 A1   Feb. 2, 2017

(51) Int. Cl.
| | |
|---|---|
| G06F 3/041 | (2006.01) |
| G02F 1/1343 | (2006.01) |
| G06F 3/044 | (2006.01) |
| G02F 1/1362 | (2006.01) |
| G02F 1/1335 | (2006.01) |

(Continued)

(52) U.S. Cl.
CPC ........ *G06F 3/0416* (2013.01); *G02F 1/13338* (2013.01); *G02F 1/13454* (2013.01); *G02F 1/133514* (2013.01); *G02F 1/134309* (2013.01); *G02F 1/136286* (2013.01); *G06F 3/044* (2013.01); *G06F 3/0412* (2013.01)

(58) Field of Classification Search
CPC ... G06F 3/0416; G06F 3/0412; H01L 27/323; G09G 2310/0264
See application file for complete search history.

(56) References Cited

U.S. PATENT DOCUMENTS

| | | | |
|---|---|---|---|
| 2014/0152616 A1 | 6/2014 | Kida et al. | |
| 2015/0348486 A1* | 12/2015 | Suzuki | G09G 3/3677 345/174 |

(Continued)

FOREIGN PATENT DOCUMENTS

| | | |
|---|---|---|
| CN | 105739768 A | 7/2016 |
| CN | 105788545 A | 7/2016 |
| CN | 206193716 U | 5/2017 |

*Primary Examiner* — Bryan Earles
(74) *Attorney, Agent, or Firm* — Anova Law Group, PLLC (57) ABSTRACT

An array substrate, a display panel and a display device are provided. The array substrate comprises a plurality of stripe-shaped first electrodes extending along a first direction and arranged along a second direction, an integrated circuit, and a first metal electrode. An extension direction of the integrated circuit is parallel to the second direction. An extension direction of the first metal electrode is parallel to the second direction. The first metal electrode and the integrated circuit are disposed on two opposite sides of the display area, respectively, and the first metal electrode is electrically connected to at least one first signal line via the integrated circuit. Each first electrode includes a first end close to the first metal electrode. The first metal electrode is electrically connected to the first end to provide a common voltage signal to the first electrode during a display period.

17 Claims, 8 Drawing Sheets

(51) Int. Cl.
*G02F 1/1345* (2006.01)
*G02F 1/1333* (2006.01)

(56) References Cited

U.S. PATENT DOCUMENTS

2016/0349881 A1* 12/2016 Fukushima ............. G06F 3/044
2016/0349907 A1* 12/2016 Kobayashi ........... G09G 3/3655
2017/0004784 A1*  1/2017 Cao ...................... G09G 3/3677
2018/0031895 A1*  2/2018 Koide ................. G02F 1/13458

* cited by examiner

ARRAY SUBSTRATE, DISPLAY PANEL AND DISPLAY DEVICE CONTAINING THE SAME

CROSS-REFERENCES TO RELATED APPLICATIONS

This application claims priority of Chinese Patent Application No. 201610617471.6, filed on Jul. 29, 2016, the entire contents of which are hereby incorporated by reference.

FIELD OF THE INVENTION

The present disclosure generally relates to the field of display technology including touch-control display technology and, more particularly, relates to an array substrate, a display panel and a display device containing the same.

BACKGROUND

Figure 1:
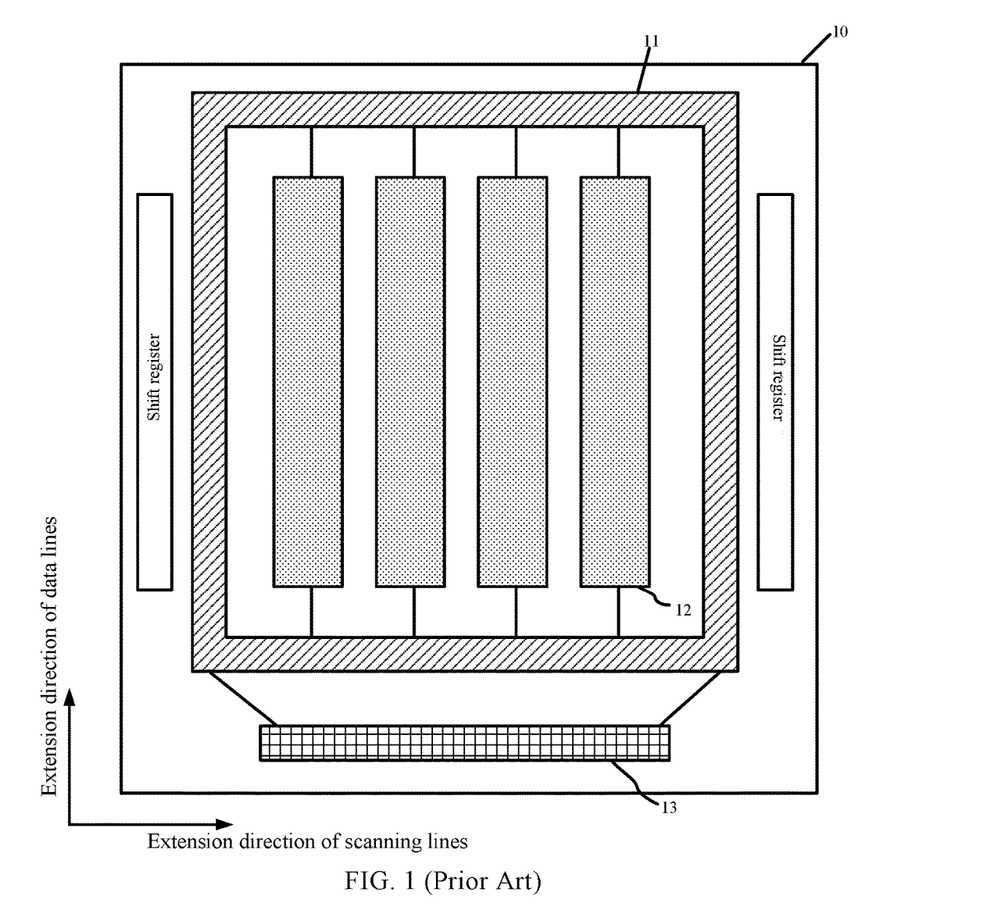
FIG. 1 illustrates an array substrate in an existing touch-control display panel.

Current mutual capacitive touch-control liquid crystal display panels often divide a common electrode into a plurality of mutually-insulated stripe-shaped sub-common electrodes. A time-sharing multiplexing method is applied, and sub-common electrodes are treated as common electrodes during a display period and multiplexed as touch-control electrodes during a touch-control period. FIG. 1 illustrates an array substrate in an existing touch-control display panel.

As shown in FIG. 1, an array substrate 10 includes a plurality of stripe-shaped sub-common electrodes 12. An extension direction of the sub-common electrodes 12 is often parallel to an extension direction of data lines. A plurality of sub-common electrodes 12 may be configured along an extension direction of scanning lines. During the display period, an integrated circuit 13 disposed on the array substrate 10 supplies a common voltage signal to each sub-common electrode 12. To balance the common voltage signal on each sub-common electrode 12, connected common voltage signal line 11 is often disposed surrounding the display area. The common voltage signal line 11 configured on two ends of each stripe-shaped sub-common electrode 12 transits a common voltage signal from the two ends of the sub-common electrodes 12 to the sub-common electrodes 12, respectively.

Shift registers are often disposed on the array substrate 10, and an extension direction of the shift registers is parallel to the extension direction of data lines. The shift registers supply a scanning signal to the scanning lines disposed on the array substrate 10. Between the shift registers and the portion of common voltage signal line 11 that is parallel to the shift registers, coupling capacitances may form and consume touch-control induced charges, thus lowering touch-control sensitivity. Further, the portion of the common voltage signal line 11 that is parallel to the shift registers may not be beneficial for the narrowing of the display panel frame.

The disclosed array substrate, display panel and display device containing the same are directed to solve one or more problems set forth above and other problems. Further, the above information disclosed in this background section is only for enhancement of understanding of the background of the invention and therefore it may contain information that does not form the prior art that is already known to a person of ordinary skill in the art.

BRIEF SUMMARY OF THE DISCLOSURE

One aspect of the present disclosure provides an array substrate. The array substrate comprises a plurality of stripe-shaped first electrodes extending along a first direction and arranged along a second direction, an integrated circuit and a first metal electrode. An extension direction of the integrated circuit is parallel to the second direction. An extension direction of the first metal electrode is parallel to the second direction. The first metal electrode and the integrated circuit are disposed on two opposite sides of the display area, respectively, and the first metal electrode is electrically connected to at least one first signal line via the integrated circuit. Each first electrode includes a first end, and the first end is close to the first metal electrode. The first metal electrode is electrically connected to the first end to provide a common voltage signal to the first electrode during a display period.

Another aspect of the present disclosure provides a display panel. The display panel comprises an array substrate, a color film substrate disposed opposite to the array substrate, and a liquid crystal layer sandwiched between the array substrate and the color film substrate. The array substrate comprises a plurality of stripe-shaped first electrodes extending along a first direction and arranged along a second direction, an integrated circuit and a first metal electrode. An extension direction of the integrated circuit is parallel to the second direction. An extension direction of the first metal electrode is parallel to the second direction. The first metal electrode and the integrated circuit are disposed on two opposite sides of the display area, respectively, and the first metal electrode is electrically connected to at least one first signal line via the integrated circuit. Each first electrode includes a first end, and the first end is close to the first metal electrode. The first metal electrode is electrically connected to the first end to provide a common voltage signal to the first electrode during a display period.

Another aspect of the present disclosure provides a display device. The display device comprises a display panel that comprises an array substrate, a color film substrate disposed opposite to the array substrate, and a liquid crystal layer sandwiched between the array substrate and the color film substrate.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined or separated under conditions without conflicts.

As discussed above, in existing mutual capacitive touch-control liquid crystal display panels, a portion of common voltage signal line that is parallel to shift registers may form coupling capacitances with the shift registers, thus lowering the touch-control sensitivity. Further, the portion of common voltage signal line that is parallel to the shift registers may occupy certain space in the left and right border of a display panel frame, which is not beneficial for the narrowing of the display panel frame.

The present disclosure provides an improved array substrate, display panel and display device. In the disclosed display device, a first metal electrode may be disposed on a side of a display area opposite to an integrated circuit, and the integrated circuit may be electrically connected to the first metal electrode via at least one first signal line. The first metal electrode may be electrically connected to each first electrode to provide a common voltage signal to each first electrode. Accordingly, space where the first metal electrode used to occupy when disposed in parallel with a shift register in the display area AA may be saved, which not only reduces the coupling capacitance formed between the first metal electrode and the shift register, but is also beneficial for the narrowing of the display panel frame.

Figure 2:
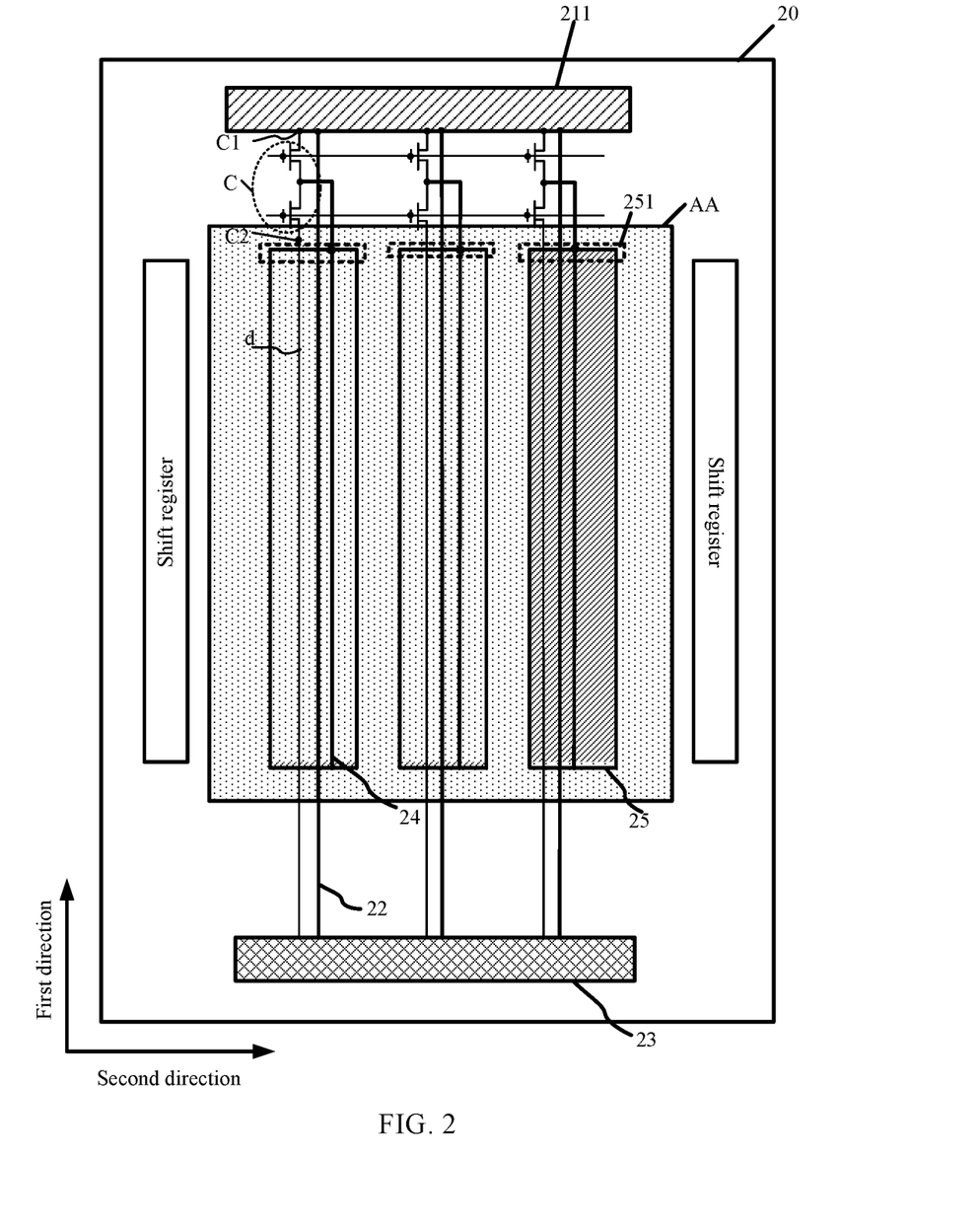
FIG. 2 illustrates an exemplary array substrate showing relative positions of a first metal electrode, first electrodes, an integrated circuit, and shift registers consistent with disclosed embodiments.
Figure 3:
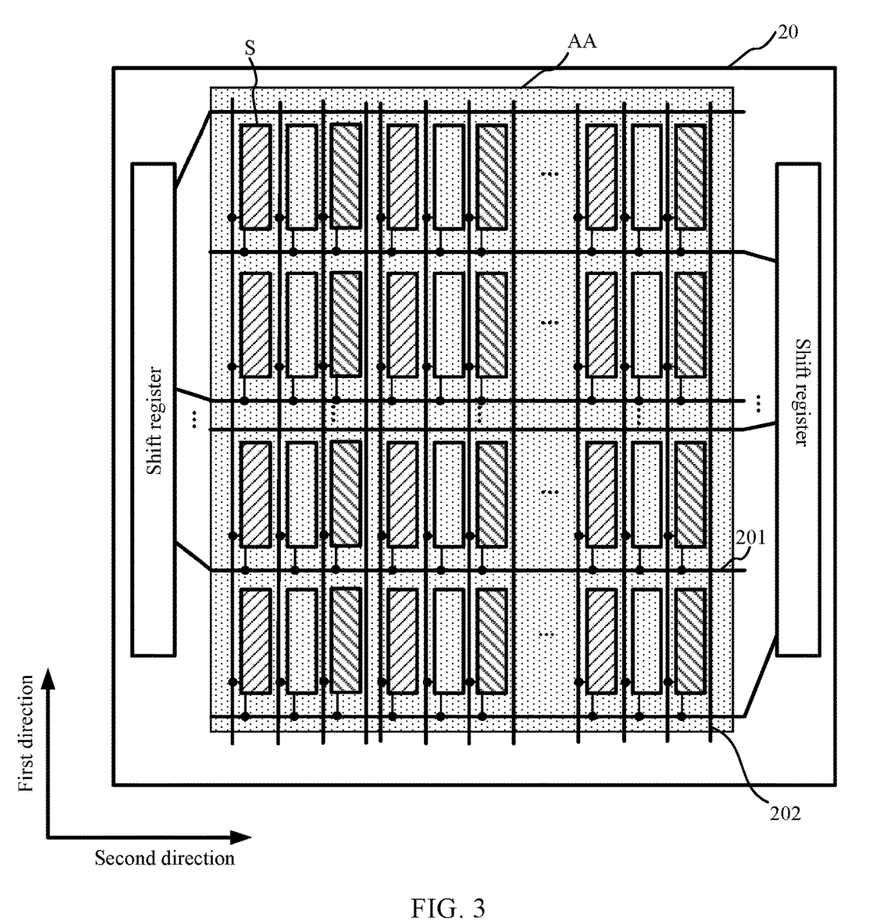
FIG. 3 illustrates an exemplary array substrate showing relative positions of scanning lines, data lines, and shift registers consistent with disclosed embodiments.

Referring to FIG. 2 and FIG. 3, FIG. 2 illustrates an exemplary array substrate showing relative positions of a first metal electrode, first electrodes, an integrated circuit, and shift registers consistent with disclosed embodiments. FIG. 3 illustrates an exemplary array substrate showing relative positions of scanning lines, data lines, and shift registers consistent with disclosed embodiments.

As shown in FIG. 2, an array substrate 20 may include a display area AA. The display area AA may include a plurality of stripe-shaped first electrodes 25. The first electrodes 25 may extend along a first direction, and a plurality of first electrodes 25 may be arranged along a second direction. Further, a first metal electrode 211 and an integrated circuit 23 may be disposed in the array substrate. Specifically, an extension direction of the first metal electrode 211 and an extension direction of the integrated circuit 23 may both be parallel to the second direction, and the first metal electrode 211 and the integrated circuit 23 may be disposed on two opposite sides of the display area AA.

The first metal electrode 211 may be electrically connected to the integrated circuit 23 via at least one first signal line. One ends of the first electrodes 25 close to the first metal electrode 211 may be assumed as first ends 251, and the first metal electrode 211 may be electrically connected to the first end 251 of each first electrode 25. The first electrodes 25 may be common electrodes. During a display period, the integrated circuit 23 may send a common voltage signal to the first metal electrode 211 via the first signal line, and the first metal electrode 211 may provide the common voltage signal to each first electrode 25 via the first end 251 of each first electrode 25 that is electrically connected to the first metal electrode 211.

In some embodiments of the present disclosure, the first signal line may include at least one first metal line 22, and an extension direction of the first metal lines 22 may be parallel to the first direction. An orthographic projection of the first metal line 22 on a plane where the array substrate 20 is located may partially overlap an orthographic projection of the first electrode 25 on the plane where the array substrate 20 is located. That is, the first metal line 22 may be disposed within an area corresponding to the first electrode 25. Optionally, the first metal line 22 may be disposed on a same layer as data lines.

As shown in FIG. 3, a plurality of scanning lines 201 and a plurality of data lines 202 may be disposed on the display area AA of the array substrate 20. The scanning lines 201 may intersect the data lines 202. The plurality of scanning lines 201 and the plurality of data lines 202 may be configured to intersect and define a plurality of pixels S, and the plurality of pixels S may be arranged in an array on the display area AA of the array substrate 20.

Further, the array substrate 20 may also include shift registers, and an extension direction of the shift registers may be parallel to the first direction. The shift registers may be disposed outside the display area AA. Each scanning line 201 may be electrically connected to one shift register to receive a scanning signal sent by the shift register. In one embodiment, the first direction may be parallel to the extension direction of the data lines, and the second direction may be parallel to the extension direction of the scanning lines.

Further, in one embodiment, the first metal lines 22 disposed on areas corresponding to the first metal electrode 25 may transmit the common voltage signal to the first metal electrode 211. Via such a configuration of the first metal electrode 211 and the first metal lines 22, the first metal electrode originally disposed between the shift register and the display area may be no longer needed. Accordingly, in one embodiment, it may not only lower a coupling capacitance between the first metal electrode and the shift register, but also benefit narrowing of a display panel frame.

In some embodiments, during a touch-control period, the first metal electrode 25 may be multiplexed as touch-control driving electrodes. Second signal lines d may be configured on the array substrate 20, and the second signal lines d may be electrically connected to the integrated circuit 23 to transmit a touch-control driving signal during the touch-control period. Optionally, the second signal lines d may coincide with the data lines 202.

In some embodiments, the array substrate 20 may include a plurality of first switch units C, and each switch unit C may include two input ends C1 and C2, and an output end C3. The input end C1 of each first switch unit C may be electrically connected to the first metal electrode 211, the input end C2 of each first switch unit C may be electrically connected to a corresponding second signal line d, and the output end C3 of each first switch unit C may be electrically connected to a first end 251 of a corresponding first electrode 25.

During the display period, the first switch units C may switch on the input ends C1 to input the common voltage signal and switch off the input ends C2 that input the touch-control signal. Further, the common voltage signal on the first metal electrode 211 may be inputted into the first ends 251 of the first electrodes 25 by switching on the output ends C3 of the switch units C, thus providing the common voltage signal to the first electrodes 25.

During the touch-control period, the first switch units C may switch on the input ends C2 to input the touch-control driving signal, and switch off the input ends C1 that input the common voltage signal. Accordingly, the touch-control driving signal on the second signal lines d may be inputted to the first ends 251 of the first electrodes 25 via the output ends C3 of the switch units C, thus providing the touch-control driving signal to the first electrodes 25.

Optionally, first electrode signal lines 24 that are parallel and electrically connected to the first electrodes 25 may be disposed on the array substrate 20, and each first electrode signal lines 24 may be electrically connected to a corresponding output end C3 of the first switch unit C. Further, the first electrode signal lines 24 may transit the common voltage signal or touch-control driving signal to the first electrodes 25 to lower a resistance of the first electrodes 25, thus ensuring uniformity of the common voltage signal and the touch-control driving signal transmitted on the first electrodes 25.

Figure 4:
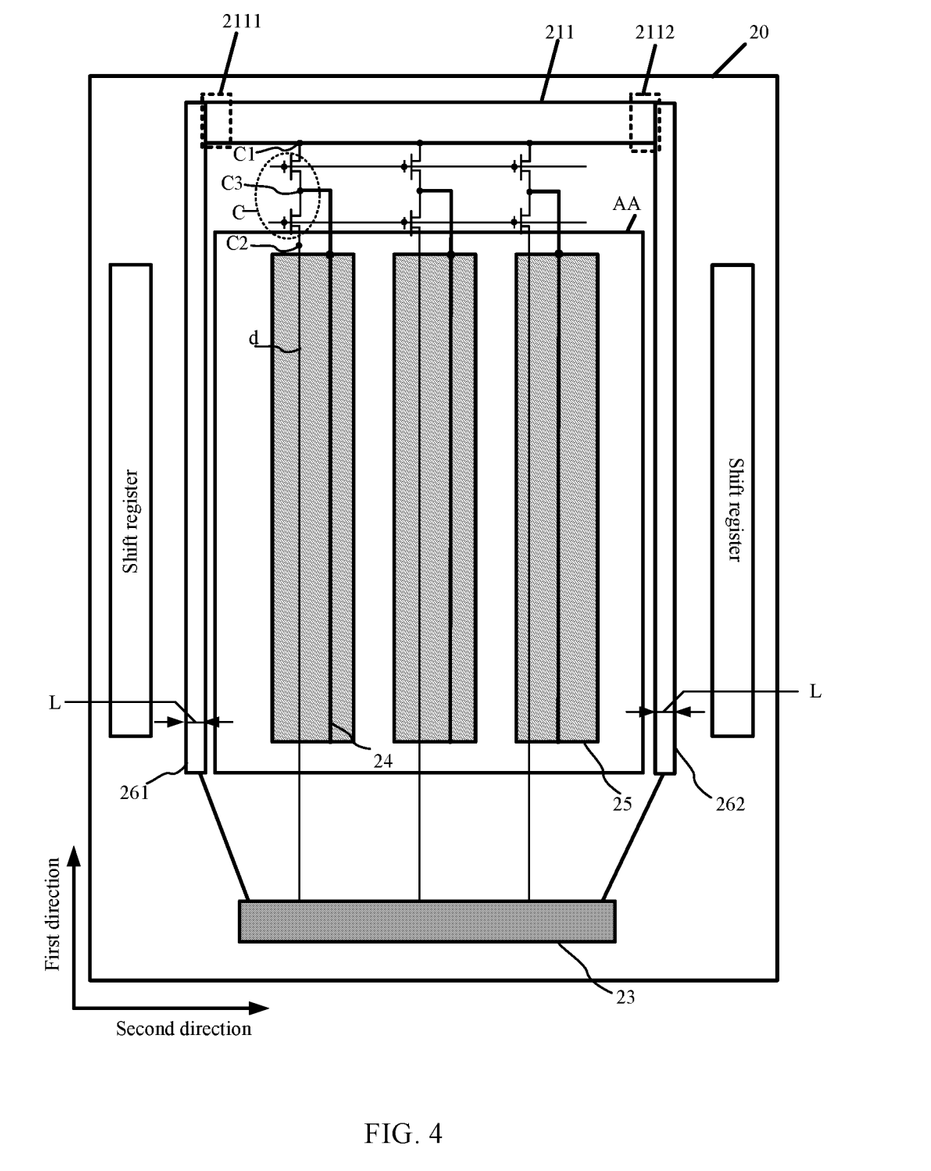
FIG. 4 illustrates another exemplary array substrate showing relative positions of a first metal electrode, second metal line, third metal line, first electrodes, an integrated circuit, and shift registers consistent with disclosed embodiments.

FIG. 4 illustrates another exemplary array substrate showing relative positions of a first metal electrode, a second metal line, a third metal line, first electrodes, an integrated circuit, and shift registers consistent with disclosed embodiments. As shown in FIG. 4, the array substrate 20 may include the first metal electrode 211, the stripe-shaped first electrodes 25, the first electrode signal lines 24, the integrated circuit 23, the shift registers and the first switch units C, the same as that shown in FIG. 2.

Different from FIG. 2, the array substrate shown in FIG. 4 may also include a second metal line 261 and/or a third metal line 262. The second metal line 261 and the third metal line 262 may be parallel to the first direction. The second metal line 261 and the third metal line 262 may be disposed on two opposite sides of the display area AA, and the second metal line 261 and the third metal line 262 may be electrically connected to two ends 2111 and 2112 of the first metal electrode 211. Further, the second metal line 261 and the third metal line 262 may be connected to the integrated circuit 23, respectively, to receive the common voltage signal sent by the integrated circuit. That is, the first signal line may include the second metal line 261 and the third metal line 262.

In one embodiment, the second metal line 261 and the third metal line 262 may be disposed between the shift register and the display area, respectively. Optionally, a width of the second metal line 261 and a width of the third metal line 262 may be equal, and the second metal line and the third metal line may be configured to be as narrow as possible. Specifically, the width L of the second metal line 261 and the third metal line 262 may be within a range of, for example, 2 μm≤L≤20 μm. Accordingly, while being electrically connected to the integrated circuit 23, the second metal line 261 and the third metal line 262 disposed on two ends of the first metal electrode 211 may be configured as narrow as possible, benefiting the narrowing of the display panel frame. Further, the second metal line 261 and the third metal line 262 may also shield interference of external signals on the signal transmitted on the first electrodes 25.

Figure 5:
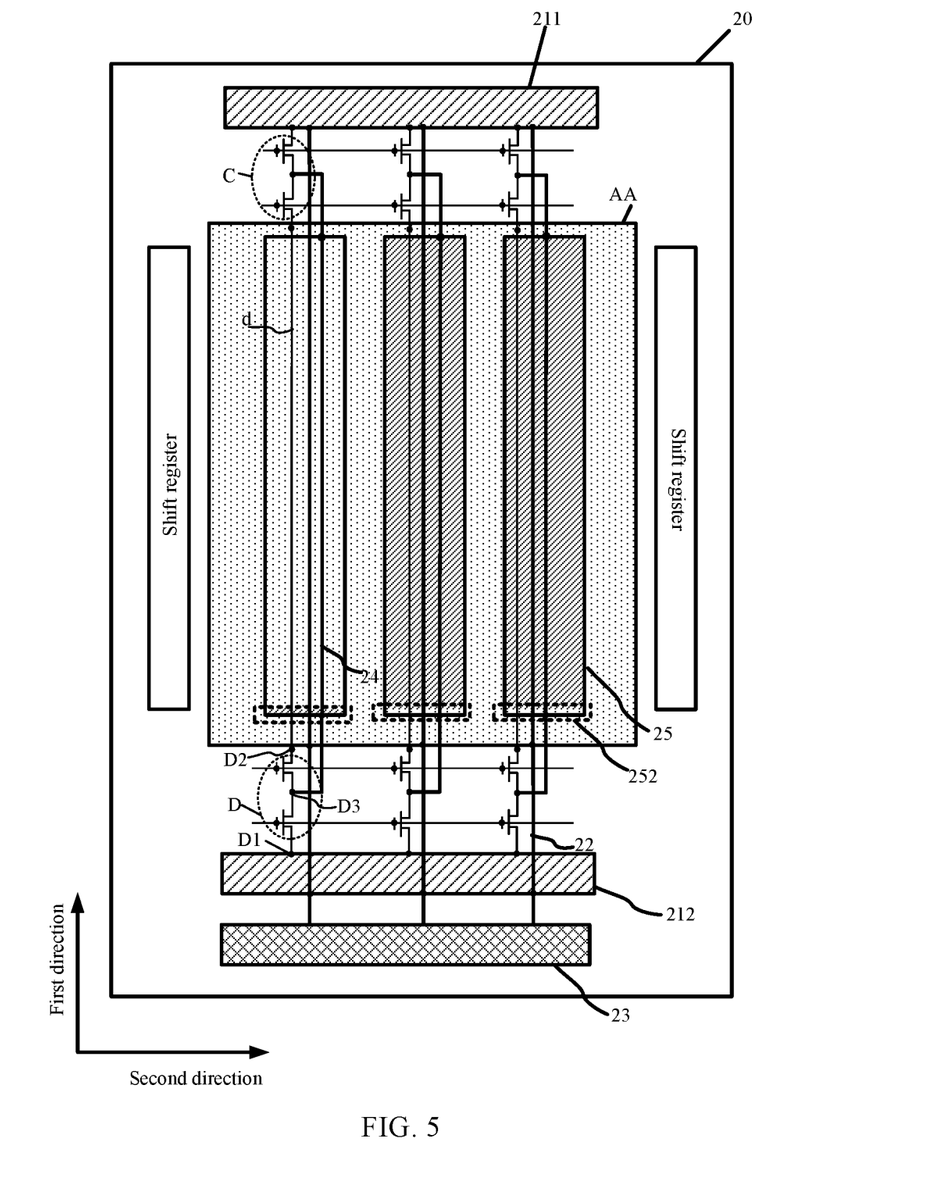
FIG. 5 illustrates another exemplary array substrate showing relative positions of a first metal electrode, a second metal electrode, first electrodes, an integrated circuit, and shift registers consistent with disclosed embodiments.

FIG. 5 illustrates another exemplary array substrate showing relative positions of a first metal electrode, a second metal electrode, first electrodes, an integrated circuit, and shift registers consistent with disclosed embodiments. As shown in FIG. 5, the array substrate 20 may include the first electrodes 25, the first electrode signal lines 24, the first metal electrode 211, the first metal lines 22, the integrated circuit 23, the first switch units C, the shift registers, and the second signal lines d, the same as that shown in FIG. 2.

Different from FIG. 2, the array substrate shown in FIG. 5 may also include the second metal electrode 212. The second metal electrode 212 may be parallel to the first metal electrode 211, and the second metal electrode 212 may be configured on one side of the display area AA that is opposite to the side where the first metal electrode 211 is located. The second metal electrode 212 may be electrically connected to the integrated circuit 23 via the first metal lines 22.

During the display period, the integrated circuit 23 may transmit the common voltage signal to the first metal electrode 211 and the second metal electrode 212 via the first metal lines 22. The second metal electrode 212 may be electrically connected to second ends 252 of the first electrodes 25 to provide the common voltage signal to the first electrodes 25 during the display period. Specifically, the second ends 252 of the first electrodes 25 may be the ends facing away the first metal electrode 211. That is, during the display period, the first metal electrode 211 may provide the common voltage signal to the first electrodes 25 via the first ends 251 of the first electrodes 25. Simultaneously, the second metal electrode 212 may provide the common voltage signal to the first electrodes 25 via the second ends 252 of the first electrodes 25.

In some embodiments, the array substrate 20 may also include a plurality of second switch units D. Each second switch unit D may include two input ends (D1 and D2), and an output end D3. The input end D1 may be electrically connected to the second metal electrode 212, and the input end D2 may be electrically connected to a corresponding second signal line d. Each output end D3 may be electrically connected to the second end 252 of a corresponding first electrode 25.

During the display period, the second switch units D may switch on the input ends D1 that input the common voltage signal, and switch off the input ends D2 that input the touch-control driving signal. Accordingly, the common voltage signal on the second metal electrode 212 may be inputted to the second ends 252 of the first electrodes 25 via the output ends D3 of the second switch units D, thus providing the common voltage signal to the first electrodes 25.

During the touch-control period, the second switch units D may switch on the input ends D2 that input the touch-control driving signal, and switch off the input ends D1 that input the common voltage signal. Accordingly, the touch-control driving signal on the second signal lines d may be inputted into the second ends 252 of the first electrodes 25 via the output ends D3 of the switch units D.

Compared to the array substrate as shown in FIG. 2, in one embodiment, on the array substrate 20, the second metal electrode 212 may be disposed on a side of the display area AA that is opposite to the side where the first metal electrode 211 is located. The first metal electrode 211 and the second metal electrode 212 may both connect to the integrated circuit 23 to receive the common voltage signal sent by the integrated circuit 23. During the display period, the first metal electrode 211 and the second metal electrode 212 may be electrically connected to the first ends 251 and second ends 252 of the first electrodes 25, respectively, to transmit the common voltage signal to the first electrodes 25. Accordingly, one embodiment may not only lower the coupling capacitance between the first metal electrode and the shift register, but also benefit the narrowing of the display panel frame, thus ensuring uniformity of the common voltage signal and the touch-control driving signal transmitted on the first electrodes 25.

In one embodiment, the second signal lines d may be electrically connected to the integrated circuit (not shown) to receive the touch-control driving signal sent by the integrated circuit 23 during the touch-control period.

Figure 6:
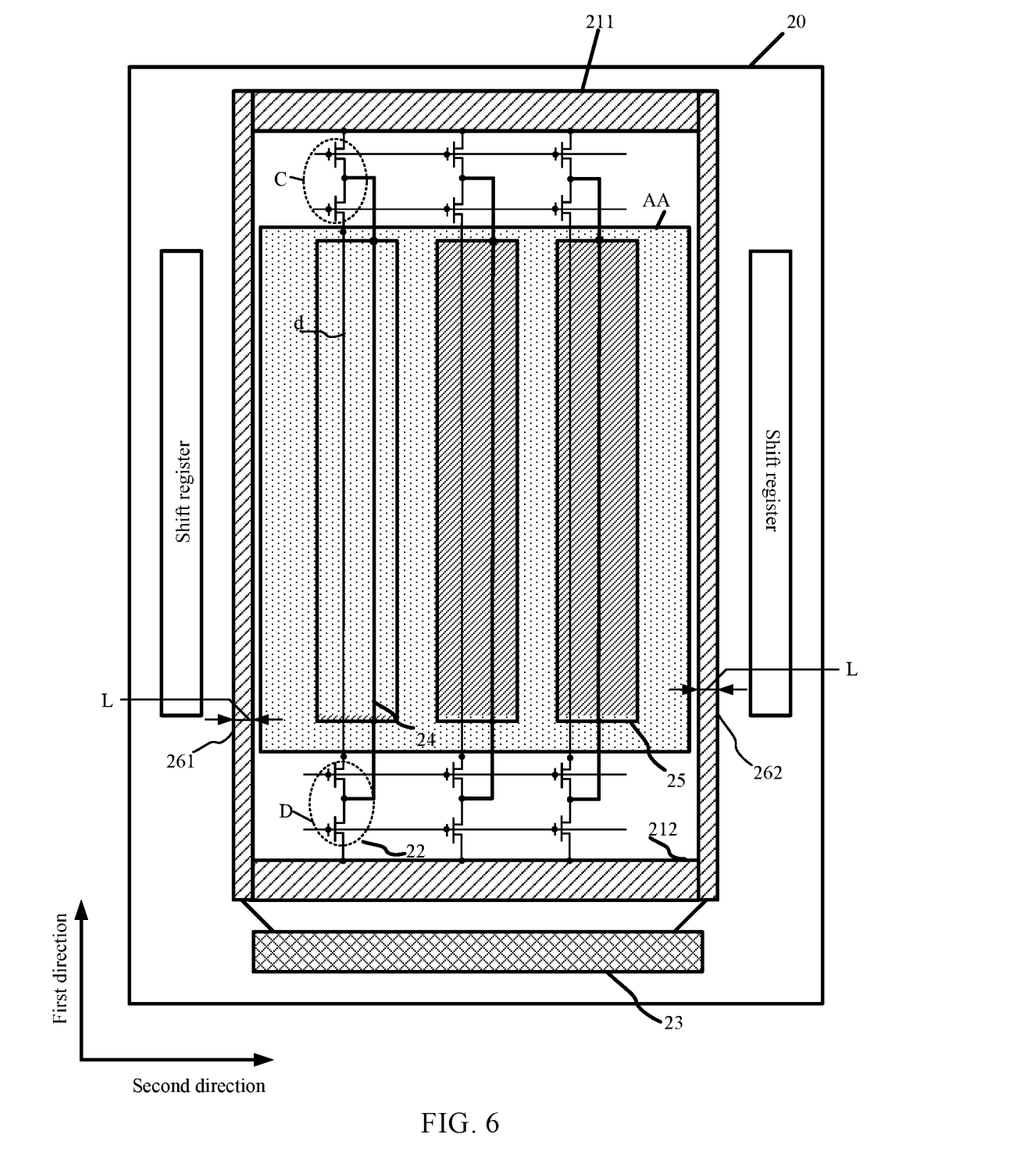
FIG. 6 illustrates another exemplary array substrate showing relative positions of a first metal electrode, a second metal electrode, second metal line, third metal line, first electrodes, an integrated circuit, and shift registers consistent with disclosed embodiments.

Further referring to FIG. 6, FIG. 6 illustrates another exemplary array substrate showing relative positions of a first metal electrode, a second metal electrode, second metal lines, third metal lines, first electrodes, an integrated circuit, and shift registers consistent with disclosed embodiments. As shown in FIG. 6, the array substrate 20 may include the first metal electrode 211, the second metal electrode 212, the first switch units C, the second switch units D, the integrated circuit 23, the shift registers, the stripe-shaped first electrodes 25, and the first electrode signal lines 24, the same as that in FIG. 5.

Different from the array substrate shown in FIG. 5, the array substrate 20 shown in FIG. 6 may also include the second metal line 261 and the third metal line 262 configured on two ends of the first metal electrode 211. The second metal line 261 and the third metal line 262 may be parallel to the first direction, and the second metal line 261 and the third metal line 262 may connect to two ends of the first metal electrode 211 and two ends of the second metal electrode 212. That is, the first metal electrode 211, the second metal electrode 212, the second metal line 261, and the third metal line 262 may form a closed area.

The second metal line 261 and the third metal line 262 may be configured between the display area AA and the shift registers, respectively. The second metal line 261, the third metal line 262 may be electrically connected to the integrated circuit 23, respectively, to receive the common voltage signal sent by the integrated circuit 23. The width of the second metal line 261 and the width of the third metal line 262 may be equal, and the second metal line 261 and the third metal line 262 may be configured to be as narrow as possible. Specifically, the width L of the second metal line 261 and the third metal line 262 may be within a range of, for example, 2 µm≤L≤20 µm. Because the second metal line 261 and the third metal line 262 may be configured as narrow as possible, the frame of the display panel may be narrowed. Further, the closed area formed by the first metal electrode 211, the second metal electrode 212, the second metal line 261, and the third metal line 262 may further shield the interference of external signals on the signal transmitted on the first electrodes 25.

Further, the second signal lines d may be electrically connected to the integrated circuit (not shown) to receive the touch-control driving signal sent by the integrated circuit during the touch-control period.

Figure 7:
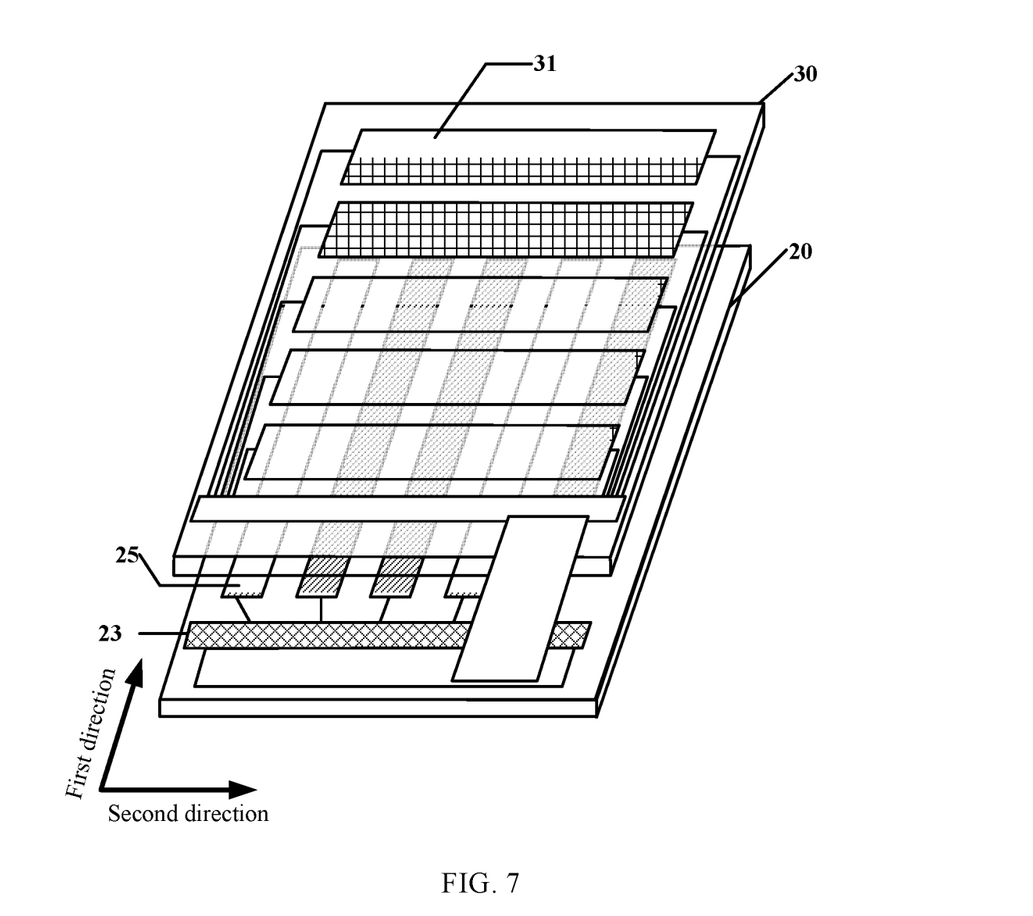
FIG. 7 illustrates an exemplary display panel consistent with disclosed embodiments.

FIG. 7 illustrates an exemplary display panel consistent with disclosed embodiments. As shown in FIG. 7, the display panel may include the array substrate 20, and a color film substrate 30 disposed opposite to the array substrate 20. A plurality of stripe-shaped second electrodes 31 may be disposed on the color film substrate 30. Second electrodes 31 may be disposed on one side of the color film substrate 30 that is close to the array substrate 20, or may be disposed on one side of the color film substrate 30 that faces away the array substrate 20. In one embodiment, an orthographic projection of the second electrode 31 on the plane where the array substrate 20 is located may partially overlap an orthographic projection of a corresponding first electrode 25 on the plane where the array substrate 20 is located.

That is, each second electrode 31 may partially intersect a corresponding second electrode 25 to form two electrodes having a structure similar to a parallel plate capacitor. Optionally, the second electrodes 31 may be touch-control sensing electrodes. The second electrodes 31 may be electrically connected to the integrated circuit 23, and during the touch-control period, the second electrodes 31 may send the touch-control sensing signal to the integrated circuit 23. When the display panel was touched, a capacitance value formed by intersection of the first electrode 25 and the second electrode 31 near a touch-control location may vary. According to whether or not capacitance values of a plurality of capacitors formed by intersection of each first electrode 25 and a corresponding second electrode 31 vary, coordinates of the touch-control location may be calculated.

Those skilled in the art may understand that, other than the array substrate and the color film substrate disposed opposite to the array substrate, the disclosed display panel may also include other common structures, such as a liquid crystal layer and a spacer support sandwiched between the array substrate and the color film substrate.

Figure 8:
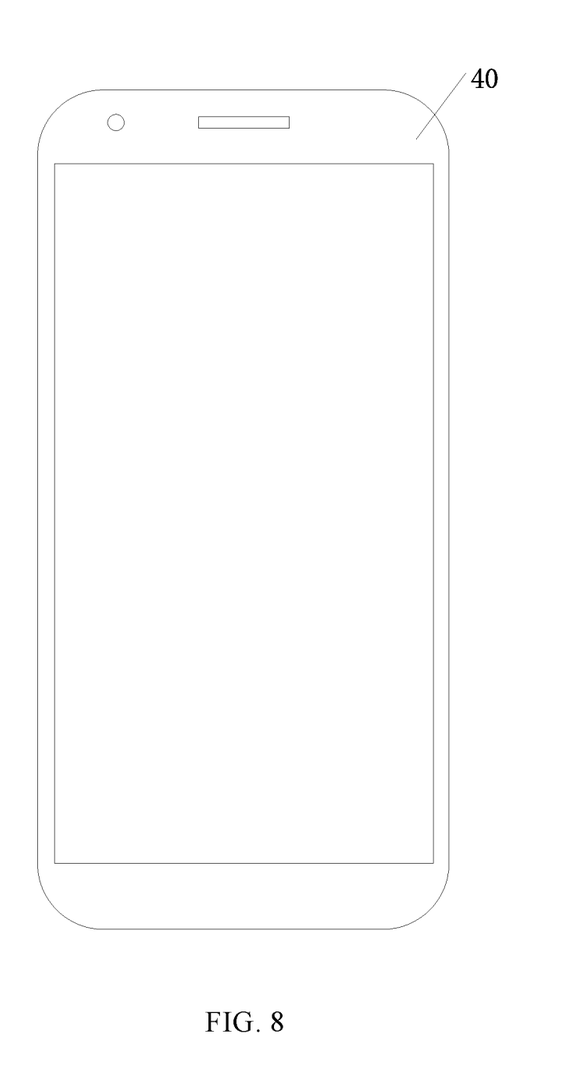
FIG. 8 illustrates an exemplary display device consistent with disclosed embodiments.

Further, referring to FIG. 8, FIG. 8 illustrates an exemplary display device. As shown in FIG. 8, the display device 40, for example, a smart phone, may include the disclosed display panel. Further, those skilled in the art may understand that other than the display panel, the display device 40 in the present disclosure may also include some other common structures, such as a backlight unit configured to provide a backlight source to the display panel. To avoid obscuring of the present disclosure, the common structures may not be described in details. The display device in the present disclosure may not be limited to a cell-phone as shown in FIG. 8, but may also be a device such as a laptop, a TV, an intelligent apparel, etc.

The embodiments disclosed herein are exemplary only and not limiting the scope of this disclosure. Various combinations, alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. An array substrate, comprising:
    a display area including a plurality of stripe-shaped first electrodes, wherein the plurality of stripe-shaped first electrodes extend along a first direction, and are arranged along a second direction;
    an integrated circuit configured on the array substrate, an extension direction of the integrated circuit being parallel to the second direction; and
    a first metal electrode disposed on the array substrate, an extension direction of the first metal electrode being parallel to the second direction, wherein the first metal electrode and the integrated circuit are disposed on two opposite sides of the display area, respectively, and the first metal electrode is electrically connected to the integrated circuit via at least one first signal line, wherein:

a stripe-shaped first electrode includes a first end, and the first end is close to the first metal electrode;

during a display period, the integrated circuit provides a common voltage signal to the first metal electrode via the at least one first signal line, and the first metal electrode is electrically connected to the first end of the stripe-shaped first electrode to provide the common voltage signal to the stripe-shaped first electrode;

the at least one first signal line includes at least one first metal line;

an extension direction of the at least one first metal line is parallel to the first direction;

the at least one first metal line is disposed within an area corresponding to the stripe-shaped first electrode; and when being projected onto a plane where the array substrate is located, an orthographic projection of the at least one first metal line overlaps with an orthographic projection of the stripe-shaped first electrode by a length of the stripe-shaped first electrode in the first direction.

2. The array substrate according to claim 1, wherein:

the array substrate includes a second metal electrode, and the second metal electrode is parallel to the first metal electrode;

the stripe-shaped first electrode includes a second end that faces away from the first metal electrode;

the second metal electrode is configured between the integrated circuit and the second end of the stripe-shaped first electrode;

the second metal electrode is electrically connected to the integrated circuit via the at least one first signal line; and the second metal electrode is electrically connected to the second end of the stripe-shaped first electrode to provide the common voltage signal to the stripe-shaped first electrode during the display period.

3. The array substrate according to claim 1, further comprising:

at least one of a second metal line and a third metal line, wherein an extension direction of the second metal line and an extension direction of the third metal line are both parallel to the first direction;

the second metal line and the third metal line are disposed on two opposite sides of the display area; and the second metal line and the third metal line are connected to two ends of the first metal electrode, respectively.

4. The array substrate according to claim 3, wherein the second metal line and the third metal line each has a width L within a range of 2 μm≤L≤40 μm.

5. The array substrate according to claim 1, further comprising:

a plurality of scanning lines and a plurality of data lines, wherein:

the plurality of scanning lines and the plurality of data lines are configured to intersect and define a plurality of pixels, and the plurality of pixels are arranged in an array;

the array substrate further includes a plurality of shift registers, and the plurality of shift registers are electrically connected to the plurality of scanning lines to provide an electricity signal to the plurality of scanning lines;

an extension direction of the shift registers is parallel to the first direction, and the shift registers are disposed outside the display area; and the first direction is parallel to an extension direction of the data lines, and the second direction is parallel to an extension direction of the scanning lines.

6. The array substrate according to claim 3, further comprising:

a plurality of scanning lines and a plurality of data lines, wherein the plurality of scanning lines and the plurality of data lines are configured to intersect and define a plurality of pixels, and the plurality of pixels are arranged in an array; and a plurality of shift registers, wherein the plurality of shift registers are electrically connected to the plurality of scanning lines to provide an electricity signal to the plurality of scanning lines, wherein an extension direction of the shift registers is parallel to the first direction, and the shift registers are disposed on an external side of the second metal line or the third metal line; and the first direction is parallel to an extension direction of the data lines, and the second direction is parallel to an extension direction of the scanning lines.

7. The array substrate according to claim 1, wherein the stripe-shaped first electrodes are common electrodes and, during a touch-control period, the stripe-shaped first electrodes are multiplexed as touch-control driving electrodes; and second signal lines are also disposed on the array substrate, and the second signal lines are electrically connected to the integrated circuit to transmit a touch-control driving signal.

8. The array substrate according to claim 7, wherein a second signal line coincides with a data line and different from the data line.

9. The array substrate according to claim 7, further including:

a plurality of first switch units, wherein:

two input ends of a first switch unit are connected to the first metal electrode and a second signal line, respectively, and an output end of the first switch unit is connected to a first end of the stripe-shaped first electrode;

during the display period, the first switch unit switches on the common voltage signal on the first metal electrode, such that the common voltage signal is inputted into the first end of the stripe-shaped first electrode via an output end of the first switch unit; and during a touch-control period, the first switch unit switches on the touch-control driving signal on the second signal line, such that the touch-control driving signal is inputted into the first end of the stripe-shaped first electrode via the output end of the first switch unit.

10. The array substrate according to claim 9, further comprising:

a plurality of second switch units, wherein:

two input ends of a second switch unit are connected to the second metal electrode and the second signal line, respectively, and an output end of the second switch unit is connected to a second end of the stripe-shaped first electrode;

during the display period, the second switch unit switches on the common voltage signal on the second metal electrode, such that the common voltage signal is inputted into second end of the stripe-shaped first electrode via an output end of the second switch unit; and during the touch-control period, the second switch unit switches on the touch-control driving signal on the second signal line, such that the touch-control driving signal is inputted into the second end of the stripe-shaped first electrode via the output end of the second switch unit.

11. A display panel, comprising:

an array substrate;

a color film substrate disposed opposite to the array substrate; and a liquid crystal layer sandwiched between the array substrate and the color film substrate, wherein the array substrate comprises:

a display area including a plurality of stripe-shaped first electrodes, wherein the plurality of stripe-shaped first electrodes extend along a first direction, and are arranged along a second direction;

an integrated circuit configured on the array substrate, an extension direction of the integrated circuit being parallel to the second direction; and a first metal electrode disposed on the array substrate, an extension direction of the first metal electrode being parallel to the second direction, wherein the first metal electrode and the integrated circuit are disposed on two opposite sides of the display area, respectively, and the first metal electrode is electrically connected to the integrated circuit via at least one first signal line, wherein a stripe-shaped first electrode includes a first end, and the first end is close to the first metal electrode, during a display period, the integrated circuit provides a common voltage signal to the first metal electrode via the at least one first signal line, and the first metal electrode is electrically connected to the first end of the stripe-shaped first electrode to provide the common voltage signal to the stripe-shaped first electrode, the at least one first signal line includes at least one first metal line, an extension direction of the at least one first metal line is parallel to the first direction, the at least one first metal line is disposed within an area corresponding to the stripe-shaped first electrode, and when being projected onto a plane where the array substrate is located, an orthographic projection of the at least one first metal line overlaps with an orthographic projection of the stripe-shaped first electrode by a length of the stripe-shaped first electrode in the first direction, wherein a plurality of stripe-shaped second electrodes are disposed on one side of the color film substrate facing away from the array substrate, and when being projected onto the plane where the array substrate is located, an orthographic projection of a stripe-shaped second electrode is located partially overlaps an orthographic projection of a corresponding stripe-shaped first electrode.

12. The display panel according to claim 11, wherein the plurality of stripe-shaped second electrodes are touch-control sensing electrodes;

the stripe-shaped second electrodes are electrically connected to the integrated circuit to send a touch-control sensing signal to the integrated circuit during a touch-control period.

13. The display panel according to claim 11, wherein:

the array substrate includes a second metal electrode, and the second metal electrode is parallel to the first metal electrode;

the stripe-shaped first electrode includes a second end that faces away from the first metal electrode;

the second metal electrode is configured between the integrated circuit and the second end of the stripe-shaped first electrode;

the second metal electrode is electrically connected to the integrated circuit via the at least one first signal line; and the second metal electrode is electrically connected to the second end of the stripe-shaped first electrode to provide the common voltage signal to the stripe-shaped first electrode during the display period.

14. The display panel according to claim 11, wherein:

the array substrate further comprises at least one of a second metal line and a third metal line, wherein an extension direction of the second metal line and an extension direction of the third metal line are both parallel to the first direction;

the second metal line and the third metal line are disposed on two opposite sides of the display area; and the second metal line and the third metal line are connected to two ends of the first metal electrode, respectively.

15. A display device, comprising a display panel according to claim 11.

16. The array substrate according to claim 1, further comprising:

a plurality of scanning lines and a plurality of data lines, and the at least one first metal line is disposed on a same layer as the plurality of data lines.

17. An array substrate, comprising:

a display area including a plurality of stripe-shaped first electrodes, wherein the plurality of stripe-shaped first electrodes extend along a first direction, and are arranged along a second direction;

an integrated circuit configured on the array substrate, an extension direction of the integrated circuit being parallel to the second direction;

a first metal electrode disposed on the array substrate, an extension direction of the first metal electrode being parallel to the second direction, wherein the first metal electrode and the integrated circuit are disposed on two opposite sides of the display area, respectively, and the first metal electrode is electrically connected to the integrated circuit via at least one first signal line; and a plurality of second signal lines disposed on the array substrate and electrically connected to the integrated circuit, wherein a second signal line is different from the at least one first signal line, wherein:

a stripe-shaped first electrode includes a first end, and the first end is close to the first metal electrode, during a display period, the integrated circuit provides a common voltage signal to the first metal electrode via the at least one first signal line, and the first metal electrode is electrically connected to the first end of the stripe-shaped first electrode to provide the common voltage signal to the stripe-shaped first electrode, and during a touch-control period, the integrated circuit provides a touch-control driving signal to the stripe-shaped first electrode via the second signal line.

\* \* \* \* \*

UNITED STATES PATENT AND TRADEMARK OFFICE
CERTIFICATE OF CORRECTION

PATENT NO.       : 10,120,495 B2  
APPLICATION NO.  : 15/294536  
DATED            : November 6, 2018  
INVENTOR(S)      : Longsheng Zou et al.

Page 1 of 1

It is certified that error appears in the above-identified patent and that said Letters Patent is hereby corrected as shown below:

On the Title Page

Item (30) should read:  
(30)    Foreign Application Priority Data  
Jul. 29, 2016    (CN) .......................... 201610617471.6

Signed and Sealed this  
Twenty-third Day of July, 2019

Andrei Iancu  
*Director of the United States Patent and Trademark Office*